Oct. 11, 1966   C. R. CANALIZO   3,277,838
GAS LIFT SYSTEM
Filed Jan. 10, 1966   4 Sheets-Sheet 1

INVENTOR
Carlos R. Canalizo

BY

ATTORNEYS

INVENTOR
Carlos R. Canalizo
BY
ATTORNEYS

INVENTOR
Carlos R. Canalizo

BY

ATTORNEYS

Oct. 11, 1966  C. R. CANALIZO  3,277,838
GAS LIFT SYSTEM

Filed Jan. 10, 1966  4 Sheets-Sheet 4

INVENTOR
Carlos R. Canalizo
BY Hastings Ackley
and
Walter J. Jagr
ATTORNEYS

United States Patent Office 3,277,838
Patented Oct. 11, 1966

3,277,838
GAS LIFT SYSTEM
Carlos R. Canalizo, 10511 Allegheny, Dallas, Tex.
Filed Jan. 10, 1966, Ser. No. 519,632
21 Claims. (Cl. 103—232)

This invention relates to well tools and more particularly to gas lift valves for use in oil wells and the like for controlling the admission of gas or air to a column of fluid in the well to lift the column and aid in flowing the fluid from the well.

This application is a continuation-in-part of my earlier filed co-pending applications Serial No. 350,245, filed March 9, 1964, and Serial No. 436,195, filed March 1, 1965.

In conventional gas lift systems, the well equipment usually includes a string of relatively small pipe called the tubing which is inserted inside a larger diameter pipe called the casing, the well equipment providing a passage through the tubing and an annular passage or annulus between the tubing and the casing. The fluids produced by the well flow to the surface through one of the passages, hereinafter called the well fluid passage, and the lifting gas or air is introduced under controlled pressures and volumes into the other passage, hereinafter called the gas passage, and injected through the suitable gas lift valves mounted in or on the tubing into the well fluid passage to aid in lifting the well fluids or oil in the well fluid passage to the surface. It will be apparent that if the tubing passage is the well fluid passage through which the well fluids flow to the surface, the annulus is the gas passage into which the lifting gas is introduced, and vice versa. Gas lift valves of the well known bellows type have a discharge port through which the lift gas is introducible into the well fluid passage and a closure member biased toward closed position closing the discharge port by the force exerted on a bellows of the valve by suitable biasing means, such as fluid under pressure. Such valves open when the force of the pressure of the lifting gas in the gas passage exerted on the bellows and of the pressure exerted on the closure member by the well fluids in the well fluid passage overcome the biasing force of the biasing means exerted on the bellows and are then held upon by the pressure of the lifting gas exerted across the full effective area of the bellows, the pressure of the gas in the gas passage being necessarily at all times greater than the pressure in the well fluid passage. The closure member is thereafter moved to its closed position wherein it prevents flow of lifting gas into the well fluid passage when the pressure in the gas passage drops to a predetermined value, the difference between the value of pressure of the lifting gas at which the valve opens and closes being termed the "spread" of the valve.

It is desirable for the efficient operation of the well and optimum utilization of the lifting gas that the "spread" between the opening and closing pressures of the lifting gas be relatively small and, at the same time, it is desirable that the valve when in its fully open position have a relatively large orifice for the rapid flow of a large volume of lifting gas therethrough into the well fluid passage since the lifting effect of the lifting gas when injected into the well fluid passage through a large discharge port or orifice causes the well fluids to be lifted more efficiently by a smaller volume of lifting gas than if the lifting gas were injected into the well fluid passage through a discharge port of smaller effective orifice. Gas lift valves of the bellows type heretofore known have discharge ports of relatively small effective orifices to minimize the area of the closure member exposed to the pressure of the well fluids in the well fluid passage when the valve is in its closed position since if this area is great relative to the effective area of the bellows exposed to the pressure of the lifting gas when the valve is in its closed position, the "spread" between the opening and closing pressures of the lifting gas is relatively great.

Accordingly, it is an object of this invention to provide a new and improved gas lift valve having a closure member operable by a bellows which enables the spread between the opening and closing pressures of the lifting gas to be relatively small and which at the same time provides a discharge port of relatively large orifice for the flow of lifting gas into the well fluid passage when the valve is open.

Another object is to provide a gas lift valve whose discharge port is closable by a two section closure member, one annular section of the closure member having a passage of smaller orifice than the discharge port and being engageable with a seat of the valve for closing the discharge port and the other inner section being biased by a bellows into engagement with a seat of the annular section for closing the passage of the annular closure section, the two closure member sections being connected for limited movement relative to one another whereby the inner section is movable to open position by the bellows to equalize the pressure differential across the annular section before the annular section is moved out of engagement with the seat of the valve to open fully the discharge port.

Still another object is to provide a gas lift valve mountable on or in the tubing of a well and having a housing providing a chamber which is in communication with the gas passage of the well through an inlet port and with the well fluid passage thereof through a discharge port wherein the discharge port is closable by a closure member biased toward closed position by a bellows means disposed in the chamber, the bellows is exposed to the pressure of the lifting gas in the gas passage through the inlet port, the closure member includes an annular seat section engageable with a seat of the housing about the discharge port thereof and a bellows section movable by the bellows, the bellows section is engageable with the seat section for closing the passage of the seat section, the bellows section having a very small area exposed to the pressure in the well fluid passage when the valve is closed, and the bellows section is connected to the annular seat section for limited longitudinal movement relative thereto whereby the effective area of the bellows exposed to the pressure of the lifting gas when the valve is in its open position is only slightly greater than the effective area thereof exposed to the pressure of the lifting gas when the closure member is in its closed position and the orifice of the discharge port is relatively great.

A further object is to provide a gas lift valve of the type described wherein the annular seat section is biased toward closed position by the force exerted thereon by the pressure of the lifting gas and by the bellows means when the valve is closed and is movable to open position out of engagement with the housing seat by a very small force exerted thereon after the bellows section of the closure member moves to its open position and opens the passage of the annular seat section to the flow of the lifting gas through the seat section passage which momentarily equalizes the pressure differential across the seat section due to the inertia of the well fluids in the well fluid passage.

A still further object is to provide a gas lift valve, of the type described, having means yieldably urging the annular seat section of the closure member toward movement with the bellows section as the bellows section moves to its open position and opens the passage of the seat section.

A still further object is to provide a gas lift valve, of the type described, wherein the annular seat section is biased towards its open position relative to the housing port.

Another object is to provide a gas lift valve having a new and improved means for limiting contracting movement of the bellows and preventing damage to the bellows by pressure forces to which the bellows is exposed.

Still another object is to provide a gas lift valve whose bellows is filled with a noncompressible fluid and opens into chamber closed by a slidable piston whose movement is limited whereby the expansion of the chamber into which the noncompressible fluid flows from the bellows as the bellows contracts is arrested when the bellows reaches its fully contracted position and the noncompressible fluid then filling the bellows and the chamber prevents further contraction or collapse of the bellows.

A further object is to provide a gas lift valve wherein the discharge port of the valve is closable by a two section closure member operable by a piston whose operation in turn is controlled by a bellows operated pilot or auxiliary valve.

Additional objects and advantages of the invention will be readily apparent from the reading of the following description of a device constructed in accordance with the invention, and reference to the accompanying drawings thereof, wherein:

FIGURE 16 is a view similar to FIGURE 15 and being a continuation thereof showing the upper portion of the gas lift valve; and, FIGURE 17 is a view similar to FIGURE 16 and showing a further modified form of the gas lift valve embodying the invention.

Figures 1, 3:
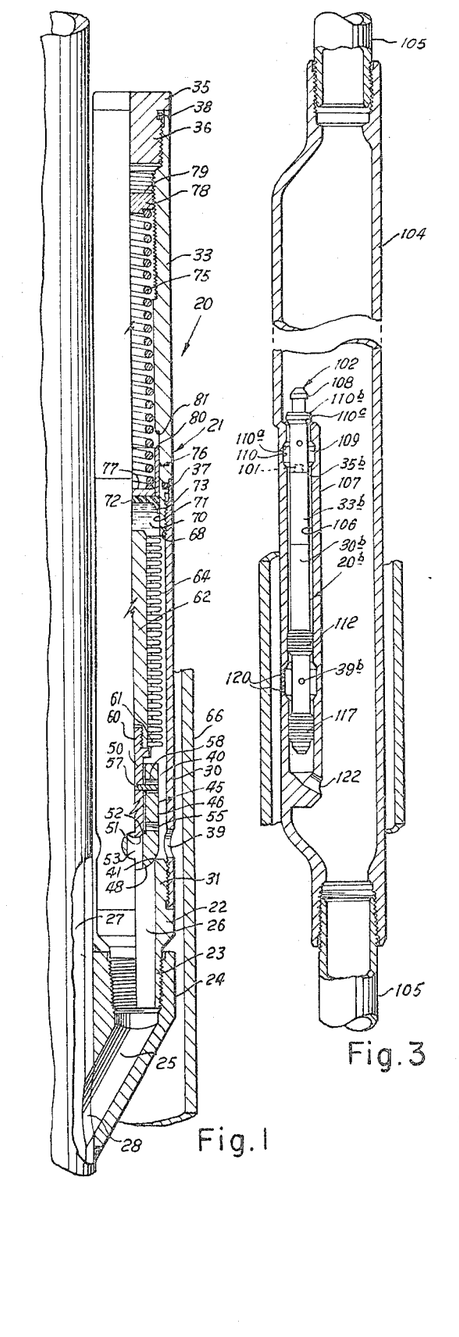
FIGURE 1 is a view partly in section and partly in elevation of a glas lift valve embodying the invention mounted on the exterior of the tubing of a well and controlling the injection of lifting gas from the annulus between the tubing and the casing into the tubing.
FIGURE 3 is a vertical, partly sectional view, showing a modified form of the gas lift valve positioned in an off-set internal pocket of a mandrel connected in the string of tubing of a well and constituting a section thereof and controlling the injection of lifting gas from the annulus into the string of tubing.

Referring now particularly to FIGURE 1 of the drawings, the gas lift valve 20 embodying the invention includes a substantially tubular housing 21 which has a bottom or discharge port section 22 whose lower reduced end portion 23 is threaded into the upper portion of a port lug 24 secured to the tubing T, as by welding. The lug 24 has a port or passage 25 which communicates with the lower end of the discharge port 26 of the bottom housing section 22 and with the internal longitudinal passage 27 of the tubing through the port 28 thereof. The housing 21 also includes an inlet port section 30 threaded on the upper reduced end portion 31 of the bottom housing section, a top section 33 threaded into the lower end portion of the inlet port housing section and a cap 35 having a reduced lower portion 36 threaded into the upper end of the top section. An O-ring or other suitable seal means 37 disposed in an external annular recess of the top section seals between the inlet port section and the top section. A similar O-ring 38 disposed in a suitable external annular recess of the cap similarly seals between the cap and the top section.

The inlet port section of the housing is provided with a plurality of lateral ports 39 through which lifting gas from the annulus between the string of tubing and the well casing C may flow into the chamber 40 housing above the annular seat 41 of the bottom housing section 22. A closure or closure member 45 disposed in the chamber 40 includes an annular seat section 46 whose outer surface 48 curves downwardly and inwardly and is sealingly engageable with the annular seat 41 which extends about the discharge port 26 of the valve. The bellows section 50 of the closure extends downwardly into the seat section and its arcuate outer lower end surface 51 is sealingly engageable with the internal upwardly facing annular seat 52 of the seat section to close the upper end of the passage or port 53 of the seat section. The seat section is also provided with a plurality of lateral ports 55 which open to the interior of the annular seat section above its seat 52. One or more connector pins 57 are rigidly secured to the bellows section of the closure member and extend radially outwardly from the bellows section into longitudinal slots 58 of the seat section to limit longitudinal movement of the two closure sections relative to one another.

The top reduced end 60 of the bellows section is threaded in the downwardly opening bore 61 of the usual bellows rod 62 which extends upwardly through the tubular corrugated bellows 64 whose bottom annular end portion 66 abuts the outer surface of the bellows rod and is secured thereto in seal tight relationship in any suitable manner as by welding or soldering. The top annular end portion 68 of the bellows similarly engages and is secured in seal tight relationship to the lower annular end surface of the top housing section. The lower end of the bellows is thus closed by the bellows rod and the upper end of the bellows opens into a chamber 70 defined by the internal surface 71 of the top section and a resilient cup 72 whose annular downwardly and outwardly tapering lip 73 sealingly engages the internal surfaces of the top housing section and prevents upward flow of the non-compressible fluid or liquid which fills the chamber and the bellows past the seal cup. The seal cup 72 is biased downwardly by a spring 75 whose lower end portions extend into a tubular plunger 76. The lower end of the spring engages the bottom wall 77 of the plunger 76 while its upper end abuts an adjusting nut 78 disposed in the upper threaded end portion of the top housing section. The nut has a transverse slot 79 which receives the blade of a screwdriver by means of which the nut may be rotated to adjust its longitudinal position in the top housing section and thus to vary or adjust the force with which the plunger 76 and therefore the seal cup 72 are biased downwardly. The incompressible liquid in the bellows and the chamber 70 transmits the biasing force of the spring to the bellows and biases the bellows rod 62 and therefore the closure downwardly in the housing toward its closed position. When the closure is in its closed position, its bellows section sealingly engages the seat 52 of the seat section to close its passage 53 and its seat section engages the seat 41 of the bottom housing section to close its discharge port 26.

Upward movement of the plunger and the seal cup is limited by the engagement of the annular top shoulder 80 of the plunger with the internal annular downwardly facing shoulder 81 of the top housing section. It will be apparent that the contraction of the bellows 64 and the upward movement of the bellows rod 62 and therefore of the closure 45 in the housing is limited since, when upward movement of the plunger 76 and the seal cup 72 is arrested, further contraction of the bellows is prevented by the incompressible liquid thus trapped in the bellows. Since all internal surfaces of the bellows are then held against further inward or contracting movement by the non-compressible fluid, the bellows will not be damaged even if excessive pressures are exerted on the external surfaces of the bellows. It will be apparent that the volume of the chamber 70 above the bellows increases as the bellows contracts and moves upwardly and decreases as the bellows expands and moves downwardly.

In use, the well fluids from the producing earth formations flow upwardly into the tubing through the lower open end thereof located below a suitable barrier or packer (not shown) which closes the annulus between the tubing and the casing C above the producing formation. Air or gas under pressure is then introduced into the casing at the surface through suitable regulator valves until the pressure of the lifting gas in the casing at the location of the valve 20 reaches a predetermined value, for example, 500 pounds per square inch and the non-compressible fluid in the bellows 64 is under a lower pressure, for example, 490 pounds per square inch. As long as the hydrostatic pressure of the well fluids in the passage 27 of the tubing at the location of the valve does not exceed another predetermined value lower than the pressure of the non-compressible fluid, for example, 480 pounds per square inch, the closure 45 will be held in its lower closed position by the force exerted by the non-compressible fluid across the full effective area of the bellows because the pressure of the lifting gas which tends to move the bellows upwardly or to its contracted position is exerted only on the effective area of the bellows which extends outwardly of the line of sealing engagement of the surface 51 of the closure bellows section 50 with the annular seat 52 of the closure seat section. The hydrostatic pressure of the well fluids in the tubing also exerts an upward force on the bellows since it acts on the area of the closure bellows section which lies within the line of sealing engagement of its surface 51 with the seat 52. The bellows is thus biased upwardly toward its contracted position by the combined force of the lifting gas and of the well fluids which does not exceed the force exerted on the bellows by the non-compressible fluid tending to hold the bellows in its expanded position and therefore the closure 45 is held in its closed position closing the discharge port 26. The annular seat section 46 is now biased downwardly not only by the force exerted on the bellows by the non-compressible fluid but also by the pressure differential existing thereacross since the upwardly acting force exerted thereon by the well fluids in the tubing is considerably lower than the force exerted thereon by the pressure of the lifting gas.

As the column of well fluids rises in the passage 27 of the tubing and reaches the predetermined height above the valve, the hydrostatic pressure of the column exerted on area of the bellows section within the line of sealing engagement of its surface 51 with the seat 52 increases to the predetermined value, for example, 470 pounds per square inch, at which the force exerted by the lifting gas on the bellows combined with the force exerted on the bellows sections by the well fluids overcomes the force exerted on the bellows by the non-compressible fluid and causes the bellows 64 to contract and move the bellows section of the closure member upwardly and out of sealing engagement with the seat 51. As soon as the bellows section moves upwardly, the lifting gas flows through the ports 55 and 53 into the upper end of the discharge port 26 of the valve and momentarily equalizes the pressure differential theretofore existing across the seat section due to the inertia of the well fluids in the discharge port 26 and in the passage 27 of the tubing. Upon the movement of the bellows section out of seating engagement with the seat 52 of the housing, the high pressure of the lifting gas is immediately exerted across the full effective area of the bellows, since the area of the bellows section previously not exposed to the lifting is now exposed thereto. The force of the lifting gas exerted on the full effective area of the bellows moves the bellows section rapidly upwardly and as the lugs or pins of the bellows section reach the upper ends of the longitudinal slots 58 of the seat section, the seat section is also moved upwardly and out of sealing engagement with the seat 41 before any appreciable rate of flow of lifting gas into the discharge port is established. The bellows now contracts and moves the two sections of the closure upwardly until the upward movement of the seal cup 72 and the plunger 76 is arrested by the engagement of the shoulders 80 and 81 of the plunger and the housing, respectively. The lifting gas then flows rapidly through the large orifice of the discharge port, the passage 25 and the port 28 into the passage 27 of the tubing beneath the column of well fluids immediately above the port 28. The lifting gas moves such column of liquids upwardly as it continues to flow into the tubing passage through the valve. The lifting gas expands as it moves upwardly in the tubing and such column or slug of well fluids is expelled from the tubing at the surface. As the well fluids are expelled from the tubing at the surface, the pressure within the tubing decreases and the pressure of the lifting gas in the annulus also decreases. When the pressure in the chamber 40 drops to or just below 490 pounds per square inch, the force exerted on the bellows by the spring 75 by means of the noncompressible fluid moves the bellows from its contracted position to its expanded position and therefore the closure member to its closed position illustrated in FIGURE 1 closing the discharge port 26. This sequence of operations is repeated as the well fluids continue to flow upwardly in the well tubing and the pressure of the lifting gas in the annulus is again raised to the predetermined value.

It will be apparent that the values of the pressure of the lifting gas in the annulus at which the valve opens and closes and the height of the column of well fluids necessary to cause opening of the valve may be varied as desired by varying the areas of the bellows and of the closure exposed respectively to the lifting gas and to the well fluids when the valve is in its closed position. For example, if the area of the bellows section within the line of sealing engagement of its surface 51 with the seat 52 is descreased while the area of the bellows exposed to the lifting gas is maintained constant, the spread between the opening and closing pressures of the lifting gas is decreased while if such area of the bellows section is increased, the spread is increased.

It will further be seen that the values of the lifting gas at which the valve opens and closes may also be varied by the varying force with which the spring 75 biases the bellows toward its expanded position and the closure member 45 downwardly toward its closed position.

It will now be seen that the illustrated and described valve has a small area on which the pressure of the well fluids in the tubing exerts a force extending to move the valve to its open position relative to the effective area of the bellows exposed to the pressure of the lifting gas also tending to move the valve to its open position when the valve is closed whereby the spread between the opening and closing pressures of the lifting gas is small.

It will further be seen that due to the provision of the seat section, which is moved out of engagement with the housing seat 41 after the bellows section has moved to its open position and equalizes the pressure across the seat section before any appreciable rate of flow of lifting gas through the valve is established, permits the provision of a discharge port of large orifice so that the rapid flow of large volumes of lifting gas into the tubing takes place causing the formation of a large bubble or column of air beneath the column or slug of liquids whereby the gas tends to lift ballistically the slug of well fluids to the surface through the tubing passage, it being apparent that flow of lifting gas through a small discharge port tends to cause the gas to form small bubbles of gas in the well fluids which then percolate upwardly through the well fluids.

Figures 2, 4, 8:
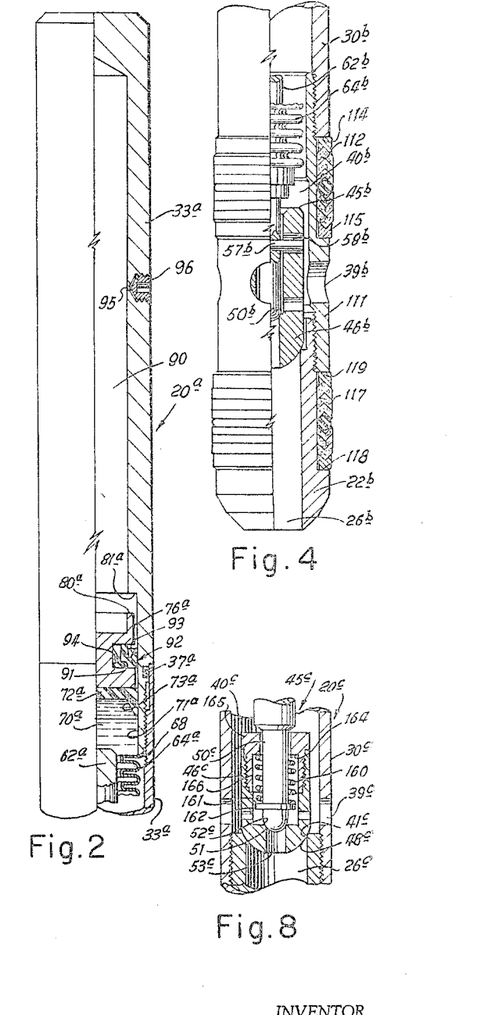
FIGURE 2 is a fragmentary vertical sectional view of a modified form of the valve illustrated in FIGURE 1.
FIGURE 4 is a fragmentary vertical partly sectional enlarged view of the valve of FIGURE 3.
FIGURE 8 is a fragmentary partly sectional view of a modified form of the closure member of the gas lift valve whose annular seat section is biased toward engagement with its bellows section by a spring.

The force tending to move the bellows to its fully expanded position in the valve 20a illustrated in FIGURE 2 is provided by a charge of compressed gas in the charge chamber 90 of the housing 21a. The valve 20a being substantially similar in structure and mode of operation to the valve 20, its elements have been provided with the same reference numerals, to which the suffix "a" has been added, as corresponding elements of the valve 20. The valve 20a differs from the valve 20 in that its plunger 76a which engages the top surface of the seal cup 72a is provided with an external annular recess 91 in which is disposed a suitable resilient seal element 92 whose outer upwardly and outwardly beveled annular lip 93 sealingly engages the internal surface 71a of the top housing section 33 and whose inner upwardly and inwardly beveled annular lip 94 sealingly engages the surface of the plunger defining the inner side of the recess 91. The top section 33a is closed at its upper end and is provided with a filler port 95 through which air under pressure may be introduced into the charge chamber 90 and which is closable by any suitable plug 96 threaded in the enlarged outer portion of the filler port. The seal element prevents leakage of the air past the plunger.

It will be apparent that the valve 30a functions in exactly the same manner as the valve 20 and that the non-compressible fluid or liquid in the chamber 70a and the bellows 64a prevents damage to the bellows when the bellows is fully contracted and upward movement of the plunger 76a is arrested by the engagement of its top shoulder 80a with the downwardly facing annular shoulder 81a of the top housing section. If desired, of course, a spring could also be positioned in the chamber 90 and also bias the plunger downwardly so that the biasing force exerted on the bellows would be exerted by a charge of compressed gas and also by a spring.

Referring now particularly to FIGURES 3 and 4 of the drawings, the gas lift valve 206 is similar to the valve 20 in structure and mode of operation and accordingly, elements of the valve 100 have been provided with the same reference numerals, to which the suffix "b" has been added, as the corresponding elements of the valve 20. The top cap 35b of the housing 21b of the valve is provided with a suitable upwardly extending threaded stud 101 by means of which the housing 21b may be connected to a suitable locking device 102. The gas lift valve 20b may be lowered through the tubing T of a well into a mandrel 104, connected between two sections 105 of the tubing to constitute a section of the tubing, and into the bore 106 of the off-set pocket 107 thereof by means of a suitable running or pulling tool of the usual set of flexible wire or line tools having means releasably engageable with the external flange 108 of the locking device. The locking device is also provided with suitable latch or lock means 109 which are extendable into the internal annular lock recess 110 of the mandrel and engageable with the internal shoulder 110a thereof for releasably securing the valve against upward movement in the pocket. Downward movement of the valve in the pocket is limited by the engagement of the external flange 110b of the locking device with the shoulder 110c of the pocket.

The ports 39b of the housing 21b are provided in a seal section 111 of the housing whose upper threaded end is threaded in the lower end of the housing section 30b and whose lower end is threaded on the upper end of the bottom or discharge port section 22b. An upper seal assembly 112 is disposed on the seal housing section and is held against upward movement thereon by its engagement with the downwardly facing shoulder 114 of the housing section 30b and against downward movement by its engagement with the upwardly facing annular shoulder 115 of the seal section. A lower seal assembly 117 is disposed on the bottom housing section, its downward movement being limited by the annular upwardly facing shoulder 118 of the bottom housing section and its upward movement being limited by its engagement with the annular downwardly facing shoulder 119 of the seal section 111. The seal assemblies 112 and 117 of the valve 20b sealingly engage with the internal seal surface of the pocket above and below the lateral ports 120 which communicate the bore of the pocket with the annulus. The mandrel also has a port 122 which communicates with the bottom end of the pocket with the passage 27 of the tubing.

It will be apparent that the valve 20b functions in the same manner as the valve 20 when positioned in the pocket 107 to control the injection of lifting gas from the annulus into the tubing. The lifting gas from the annulus flows through the ports 120 into the bore of the pocket, through the chamber 40b and the discharge port 26b of the valve, and through the port 122 of the pocket into the tubing when the closure 45b is moved upwardly to its open position.

Figure 5:
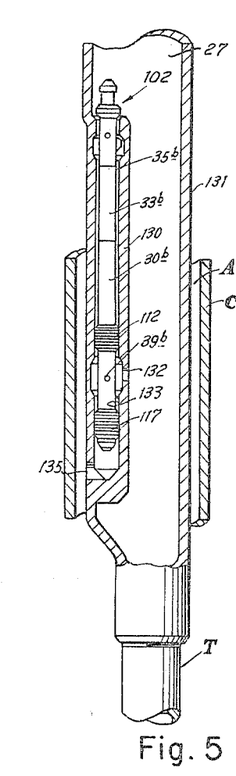
FIGURE 5 is a vertical, partly sectional view, showing the valve illustrated in FIGURES 3 and 4 positioned in an off-set internal pocket of a mandrel connected in a string of tubing of a well and constituting a section thereof and controlling the injection of lifting gas from the tubing into the annulus.

Referring now to FIGURE 5 of the drawings, the valve 20b is shown positioned in the pocket 130 of a mandrel 131 connected in a string of tubing T for controlling the injection of lifting gas from the longitudinal passage 27 of the string of tubing into the annulus A between the string of tubing and the casing C of the well. The pocket is provided with a plurality of ports 132 through which the lifting gas flows into the bore 133 of the pocket between the upper and lower seal assemblies 112 and 117 of the gas lift valve 20b. A port 135 of the mandrel communicates the bottom of the bore of the pocket with the annulus. It will be apparent that the valve 20b when positioned in the bore 133 of the pocket 130 of the mandrel 131 controls the injection of the lifting gas from the longitudinal passage 27 of the string of tubing T into the annulus A and when it is positioned in the bore 107 of the mandrel 104, FIGURE 3, controls the injection of lifting gas from the annulus into the passage 27 of the tubing.

Figure 6:
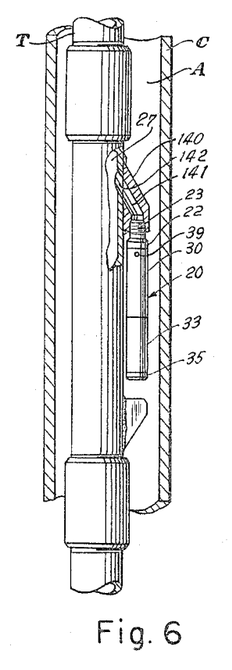
FIGURE 6 is a vertical partly sectional view showing the gas lift valve of FIGURE 1 connected to the exterior of the tubing of a well and controlling the injection of gas from the annulus into the tubing.

Referring now to FIGURE 6 of the drawings, the gas lift valve 20 is shown connected to a port lug 140 of the tubing T with the threaded end portion 23 of its biasing discharge port section 22 threaded in the lower end of the port 141 of the lug 140. The port 141 communicates at its upper end with the tubing flow passage 27 through the port 142 of the tubing. It will be apparent that the valve 20, when connected to the port lug 40 of the string of tubing T functions in the same manner as when connected to the port lug 24, FIGURE 1, to control the injection of lifting gas from the annulus A into the passage 27 of the string of tubing. The seat section 46 is now however biased toward its open position by gravity so that when the closure bellows section 50 is moved downwardly and out of engagement with the seat 52 of the closure seat section 46, the seat section will tend to move downwardly by gravity as soon as the pressure differential thereacross is equalized to that the bellows does not need to exert as great a force to move the closure 45 to its fully open position when the valve is mounted on the tubing with the housing discharge port section 22 uppermost as when it is connected in the position illustrated in FIGURE 1 with its housing section 22 in its lowermost position wherein the bellows must move both the closure section 50 and the seat section 46 upwardly against the force exerted thereon by gravity.

Figure 7:
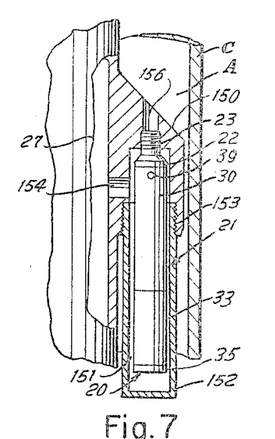
FIGURE 7 is a vertical fragmentary partly sectional view showing the gas lift valve illustrated in FIGURE 1 connected to the string of tubing in vertically reversed position and controlling the injection of gas from the tubing into the annulus.

Referring now to FIGURE 7 of the drawings, the valve 20 is shown connected to a port lug 150 of a tubing T to control the injection of lifting gas from the passage 27 of the tubing T into the annulus A to lift to the surface well fluids produced through the annulus. The port lug has an internal chamber 151 formed by the tubular case 152 which is threaded, as at 153, to the port lug 150. The lifting gas introduced into the passage 27 of the tubing flow into the chamber 151 through the port 154 of the tubing and then through the ports 39 and the chamber 40 and the discharge port 26 of the valve to the discharge port 156 of the lug in whose lower enlarged threaded portion is secured the threaded end portion 23 of the discharge port section 22 of the valve housing 21.

It will now be apparent that when the tubing T is provided with an external port lug 140, as shown in FIGURE 6, the valve 20 will control the injection of lifting gas from the annulus into the tubing passage 27 and that when the tubing is provided with a port lug 150, the valve 20 will control the flow of the lifting gas from the passage 27 of the tubing to the annulus A.

Referring now to FIGURE 8 of the drawing, the closure 45c, the valve 20c is similar to the valve 20 and accordingly the elements of the valve 20c have been provided with the same reference numerals to which the suffix "c" has been added as the corresponding elements of the valve 20. The valve 20c differs from the valve 20 in that the seat section 46c of its closure 45c is biased by a spring 160 toward a closed position wherein its seat 52c engages the arcuate seat surface 51c of the bellows section 50c. The lower end of spring 160 engages the upper annular shoulder or surface 161 of an external flange 162 of the bellows section while its upper end engages the downwardly facing annular shoulder or surface 164 of the stop member 165 whose lower reduced portion 166 is threaded in the upper end of the seat section 46c. It will be apparent that the spring 160 biases the closure member 46c upwardly relative to the bellows section so that when the bellows section is moved upwardly to open the passage 53c of the closure member and the pressure differential across the seat section is momentarily equalized, the spring 160 will immediately move the seat section to its open position and its seat surface 48c out of engagement with the housing seat 41c. The spring 160 causes the seat section to move out of sealing engagement with the seat 41c as quickly as possible after the bellows section has moved out of sealing engagement with the seat 52c and thus facilitates the opening of the valve. When the valve begins to close as the pressure in the chamber 40c drops to or below the pressure of the noncompressible fluid in the bellows, the spring 160 will continue to hold the seat section in its uppermost position relative to the bellows section 50c and thus will delay the engagement of the seat 48c with the housing seat 41c and thus slightly increase the spread between the opening and closing pressures of the lifting gas.

Figure 9:
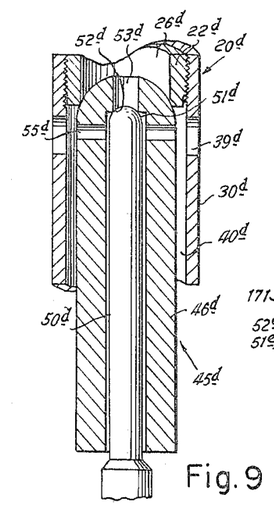
FIGURE 9 is a fragmentary partly sectional view of another modified form of the closure member whose annular seat section is biased by gravity toward engagement with its bellows section.

The valve 20d illustrated in FIGURE 9 is similar to the valve 20 and, accordingly, its elements have been provided with the same reference numerals, to which the suffix "d" has been added, as the corresponding elements of the valve 20. The valve 20d differs from the valve 20 in that the seat section 46d of its closure 45d is elongated to cause it to have sufficient mass to cause it to be biased downwardly by gravity with a predetermined force relative to the bellows section 50d toward the position wherein the seat 52d engages the seat surface 51d of the bellows section 50d. The valve 20d must be connected to the tubing with its housing discharge port section 22d in its uppermost position so that when the closure bellows section 50d moves downwardly toward its open position and its surface 51d moves out of sealing engagement with the seat 52d and opens the port 53d, the pressure differential across the seat section is momentarily equal as the lifting gas flows into the discharge port 26d and the seat section 46d will move downwardly by gravity, out of seating engagement with the seat 41d.

Figure 10:
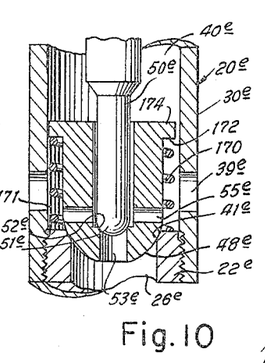
FIGURE 10 is a fragmentary vertical partly sectional view showing another modified form of the closure member whose annular seat section is biased toward engagement with the bellows section and out of engagement with the seat of the valve housing by a spring.

The valve 20e illustrated in FIGURE 10 is similar to the valve 20 and, accordingly, its elements have been provided with the same reference numerals to which the suffix "e" has been added as the corresponding elements of the valve 20. The valve 20e differs from the valve 20 in that seat section 46e of its closure 45e is biased towards its open position wherein its arcuate seat surface 48e is out of engagement with the housing seat 41e by a spring 170. The spring is disposed about the seat section with its bottom end bearing against the annular upwardly facing end surface or shoulder 171 of the housing discharge port section 22e and its upper end bearing against the annular downwardly facing shoulder 172 of the top external shoulder flange 174 of the annular seat section 46e. The spring 170 also biases the annular seat 52e of the seat section toward seating engagement with the seat surface 51e of the bellows section 50e of the closure 45e. It will be apparent that when the bellows section 50e is moved upwardly by the bellows, the seat surface 51e of the bellows section moves out of engagement with the seat 52e of the seat section, the pressure differential across the seat section 46e is momentarily equalized due to the flow of the lifting gas into the discharge port 26e through the port 53e of the seat section and the force of the spring 170 is immediately effective to move the seat section upwardly in the chamber 40e thus moving its seat surface 48e out of engagement with the housing seat 41e of the housing discharge port section 22e and thus opens the discharge port 26e to flow of lifting gas. The spring 170 then holds the seat section 46e in its upper open position until the pressure in the chamber 40e drops to a predetermined value whereupon the closure bellows section 50e moves downwardly, engages the seat 52e and then moves the seat section 46e downwardly to its closed position in engagement with the housing seat 41e.

Figure 11:
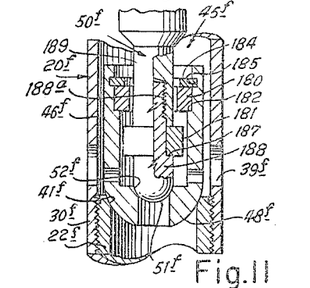
FIGURE 11 is a fragmentary vertical partly sectional view of another modified form of the closure member whose annular seat section is biased toward engagement with its bellows section by a magnetic means.

Referring now to FIGURE 11 of the drawing, the valve 20f is similar to the valve 20 and, accordingly, its elements have been provided with the same reference numerals, to which the suffix "f" has been added, as corresponding elements of the valve 20. The valve 20f differs from the valve 20 in that the annular seat section 46f of its closure 45f is biased relative to its bellows section 50f or toward the position wherein its seat 52f engages the seat surface 51f of the bellows section 50f by a pair of permanent annular magnets 180 and 181. The magnet 180 disposed in the seat section 46f is held against downward movement by the engagement of its bottom surface with the internal annular upwardly facing shoulder 182 of the seat section and is held against upward movement by the engagement of its upper surface with a split retainer or lock ring 184 whose peripheral portions are receivable in the internal annular recess 185 of the seat section. The magnet 181 is rigidly secured to the bellows section, its bottom annular surface engaging the annular upwardly facing shoulder 187 of the lower member 188 whose upper threaded end portion is received in the downwardly opening bore 188a of the upper member 189 of the bellows section 50f of the closure 45f. The polarity of the two magnets is such that the magnets repel one another and thus bias the seat section 46f upwardly relative to the bellows section 50f. For example, the lower portion of the annular magnet 180 and the upper portion of the annular magnet 181 may be both north poles or both south poles.

Figure 12:
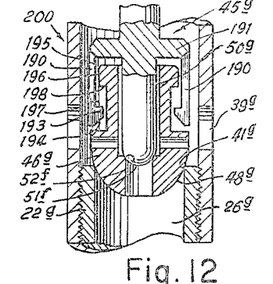
FIGURE 12 is a fragmentary vertical partly sectional view of another modified form of the closure member.

Referring now to FIGURE 12 of the drawing, the valve 20g is similar in structure and mode of operation to the valve 20 and, accordingly, its elements have been provided with the same reference numerals, to which the suffix "g" has been added, as the corresponding elements of the valve 20. The valve 20g differs from the valve 20 in that the annular seat section 46l of its closure member 45g is moved out of seating engagement with the seat 41g of its housing discharge port section 22g by means of collet fingers 190 carried by its bellows section 50g. The resilient collet fingers 190 extend downwardly from the external annular flange 191 of the bellows section and have inwardly extending bosses 193 whose bottom cam shoulders 194 are beveled upwardly. The cam shoulders engage the shoulder 195 of the external flange 196 of the seat section 46 as the bellows section is moved downwardly into the seat section and cam the lower free ends of the collet fingers resiliently outwardly to permit the movement of the bosses 193 past the flange 196. The upwardly facing shoulders 197 of the bosses 193 engage the downwardly facing annular shoulder 198 of the external flange 196 to lift the seat section 46g after the end or seat surface 51g of the bellows section has moved out of engagement with the seat 52g and the pressure across the seat section 46g has been equalized. The seat section can thus be moved upwardly out of seating engagement with the seat 41g by a relatively small force.

Figure 13:
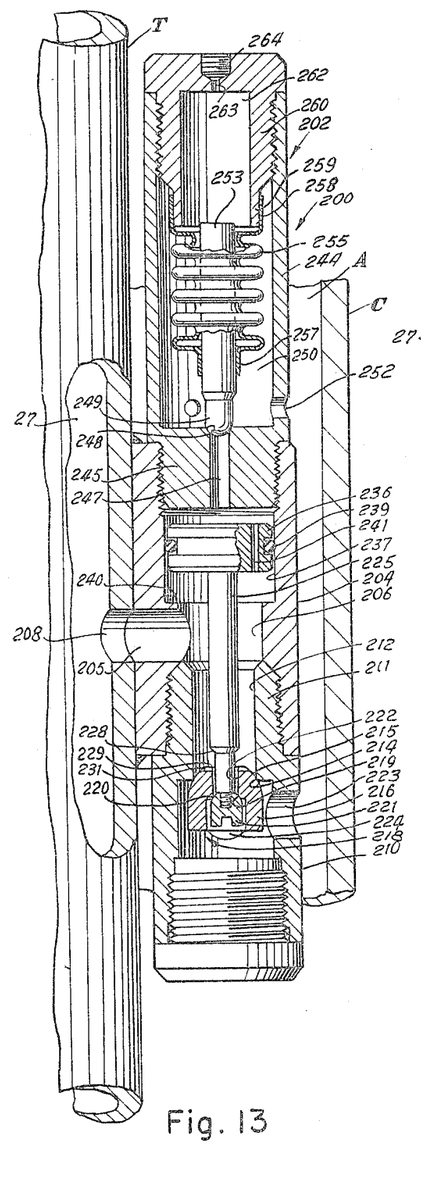
FIGURE 13 is a vertical partly sectional view of another modified form of the gas lift valve embodying the invention mounted on the exterior of a string of tubing and controlling the injection of lifting gas from the annulus into the string of tubing.

Referring now particularly to FIGURE 13 of the drawings, the gas lift valve 200 which controls the injection of lifting gas from the annulus A between the casing C and the tubing T of a well into the longitudinal passage 27 of the tubing includes a tubular housing 202 whose intermediate piston chamber section 204 is rigidly secured to the tubing as by welding. The intermediate housing section has a lateral port 205 which communicates its longitudinal bore 206 with the flow passage of the tubing through a lateral port 208 of the tubing. The bottom or discharge port section 210 of the housing has a reduced upper end portion 211 threaded in the lower end of the intermediate housing section. The bottom housing section has a discharge passage or port 212 and a seat 214 about the discharge port which is engageable by the arcuate seat surface 215 of the annular seat section 216 of the closure 218 of the valve. The seat closure section has an annular internal seat 219 which is engageable by the arcuate seat surface 220 of the piston section 221 of the closure to close the port or passage 222 of the seat section. The closure 218 when in its upper closed position in the housing with the inner or piston closure section seated on the seat 219 of the seat section and with the seat section seated on the housing seat 214 prevents fluid flow through the lateral ports 223 and the discharge port 212 of the bottom housing section. The lower end of the bottom housing section is closed by a suitable cap 224 threaded therein.

The piston rod is enlarged above its lower end to provide a downwardly facing annular shoulder 228 which is engageable with the top surface 229 of the annular seat section 216 to limit downward movement of the piston rod relative to the seat section. The upper end of the annular seat section is provided with a slot 231 to insure that the passage 223 of the seat section is open when the piston rod in its lowermost position relative to the seat closure section 216.

The piston 236 on the upper end of the piston rod 225 is slidable in the upper enlarged portion 237 of the bore 206 of the intermediate housing section and is provided with an external annular recess in which is disposed an O-ring 239 which seals between the piston and the intermediate housing section. Downward movement of the piston is limited by the engagement of its bottom surface with the upwardly facing annular stop shoulder 240 of the intermediate housing section. The piston has a passage 241 of restricted orifice which opens at the top and bottom surfaces of the piston.

The top section 244 of the housing has a reduced lower end portion 245 threaded in the upper end of the intermediate housing section and a passage 247 which opens to the upper end of the bore 206 of the intermediate housing section above the piston. The passage 247 is of greater orifice than the piston passage 241. The seat 248 of the top housing section at the upper end of the passage is engageable by an auxiliary or pilot closure 249 for preventing fluid flow from the chamber 250 of the top housing section through the passage 247 into the bore 206 above the piston. The chamber communicates with the annulus A through a plurality of ports 252 of the top housing section.

The pilot closure 249 is connected to or is integral with the rod 253 which extends through the bellows 255. The lower annular end portion 257 of the bellows is secured to the bellows rod 253 in seal tight relationship in any suitable manner, as by welding or soldering. The upper annular end portion 258 of the bellows extends about the reduced lower end portion 259 of a tubular charge chamber member 260 threaded in the upper end of the top housing section. The upper end of the bellows opens into the lower end of the chamber 262 of the chamber member into which gas under pressure is introducible through an inlet port 263 which is closable by a suitable plug 264 threaded into the enlarged upper portion of the inlet port.

In use, the chamber 262 is filled with a gas under a predetermined pressure, for example, 490 pounds per square inch while the pressure of the lifting gas in the annulus is raised to a higher predetermined pressure, for example, 500 pounds per square inch. The pressure of the gas in the chamber 262 exerted across the full effective area of the bellows 255 holds the auxiliary closure 249 in its lower closed position since the lifting gas exerts a force tending to move the bellows toward a contracted position only on that portion of the effective area of the bellows lying outwardly of the line of sealing engagement of the closure 249 with the seat 248. The area of the closure 249 within the line of sealing engagement of the seat 248 with the closure is now exposed to the pressure of the well fluids in the flow passage 247 of the tubing which is of course smaller than the pressure of the lifting gas and the pressure in the charge chamber 262. The pressure on both sides of the piston 236 is now equal and the piston is held in its upper position due to the force exerted by the pressure of the lifting gas on the area of the piston closure section 221 within the line of sealing engagement of the seats 219 with the surface 220 of the piston closure section since the pressure within the discharge passage 212 is now considerably lower than the pressure of the lifting gas. The annular seat closure section 216 is also held in its closed position by the force exerted by the pressure of the lifting gas on the downwardly facing area thereof within the line of sealing engagement of the seat 214 with its surface 215.

When the column of well fluids in the tubing passage 27 above the port 208 attains a predetermined height wherein its hydrostatic pressure at the port 208 is of predetermined value, for example, 460 pounds per square inch, its pressure communicated to the housing passage 247 through the piston passage 241 causes the total force exerted by the lifting gas and by the well fluids on the bellows to exceed the force exerted thereon by the charge of gas in the chamber 262 and the bellows contracts and moves the closure 249 out of sealing engagement with the housing seat 248. The pressure of the lifting gas is then communicated to the housing bore 206 above the piston 236 and, since the effective orifices of the ports 252 and of the passage 247 are greater than the orifice of the passage 241, a downward force is exerted by the lifting gas across the area of the piston within the line of sealing engagement of its O-ring 41 with the housing. This area is considerably greater than the area of the piston closure section 221 on which the pressure of the lifting gas exerts an upward force on the piston. As a result the piston is moved quickly downwardly and, as it moves downwardly, the piston closure section 221 is moved out of sealing engagement with the seat 219 of the seat closure section 216. The flow of lifting gas through the passage 222 of the seat section into the discharge passage or port 212 now momentarily equalizes the pressure differential theretofore existing across the seat section tending to hold it in its closed upper position so that the seat section tends to move downwardly by gravity. In addition, as the piston moves quickly downwardly, the shoulder 228 of the piston rod engages the top surface 229 of the seat section and also tends to move the seat section downwardly.

The lifting gas then flows from the annulus through the ports 223, the discharge passage 212, the bore 206 and the ports 205 and 208 into the tubing passage below the column of well fluids and moves the well fluids upwardly to the surface. As the lifting gas flows inwardly through the ports 223 and the discharge passage 212, an upward force is exerted on the piston rod due to the pressure differential now existing thereacross since the pressure at the downstream end of the discharge passage 212 is smaller than at the upstream end thereof. This upwardly acting force is considerably smaller than the downwardly acting force exerted on the piston by the lifting gas communicated to the upper end of the bore 206 above the piston through the passage 247 due to the relatively small orifice of the piston passage 241. The piston will therefore be held in its lowermost position holding the seat closure 218 in its lowermost position until the pressure of the lifting gas in the chamber 250 falls below the pressure of the charge of gas in the chamber 262 at which time the bellows again expands and causes the closure to again engage the housing seat 248 and thus close the passage 249. The pressure on both sides of the piston now equalizes through the piston passage 241 and the force exerted on the piston rod and the closure 218 by the pressure differential thereacross now causes the piston rod to move upwardly. As the piston is moved upwardly, such pressure differential increases quickly as the discharge port is progressively closed and accelerates the upward movement of the piston rod and the closure 218 and causes the closure 218 to be moved to its closed uppermost position illustrated in FIGURE 13.

It will now be seen that the spread between the opening and closing pressure of the lifting gas can be relatively small and at the same time the discharge port or passage of the valve 200 has a relatively small orifice to permit the rapid injection of large volumes of the lifting gas into the tubing.

The use of the auxiliary closure 249 and of the piston which provides a large mechanical advantage permits a large opening force to be exerted on the closure 218 by the lifting gas when the proper pressure conditions occur in the annulus and the tubing.

Figure 14:
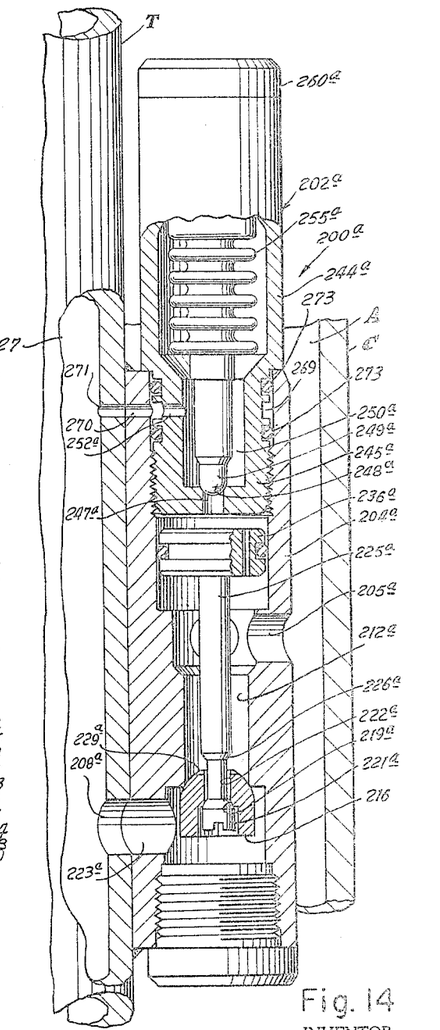
FIGURE 14 is a vertical fragmentary partly sectional view of another modified form of the gas lift valve mounted on the exterior of the string of tubing and controlling the injection of lifting gas from the tubing into the annulus of the well.

The valve 200a illustrated in FIGURE 14 is similar to the valve 200 and accordingly its elements have been provided with the same reference characters to which the suffix "a" has been added as the corresponding elements of the valve 200. The valve 200a differs from the valve 27 in that its ports 223a open not to the annulus but to the passage 27 of the tubing T through the port 208a of the tubing since the lifting gas is introduced into the well through the passage 27 of the tubing. Similarly, the lifting gas is introduced into the chamber 250a through the port 252a and the annular recess 269 of the top housing section 244a and the aligned ports 270 and 271 of the top housing section and the tubing, respectively. The reduced portion 245a of the top housing section 244a is provided with a pair of external annular recesses in which are disposed O-rings 273 which seal between the top housing section and the intermediate section 204a above and below the external recess 269.

It will be apparent that the valve 200a functions in exactly the same manner as the valve 200 to control injection of lifting gas from the tubing into the annulus A when the pressure of the lifting gas at the valve is raised to a predetermined value, for example, 500 pounds per square inch, and the column of well fluids in the annulus A above the ports 205a exceeds a predetermined height. The combined force of the hydrostatic pressure of the column of well fluids exerted on the area of the closure 249a within the line of sealing engagement thereof with the seat 248a and of the lifting gas on the bellows 255a then causes the bellows to contract and move the auxiliary closure 249a out of sealing engagement with the seat 248a. The pressure of the lifting gas is then applied through the passage 274a to the upwardly facing surface of the piston 236a moves the piston downwardly. Such downward movement of the piston causing the piston closure section 221a to move out of sealing engagement with the seat 219a so that the lifting gas flowing through the passage 222a of the seat closure section momentarily equalizes the pressure differential across the seat closure section which then moves downwardly by gravity or is moved downwardly by the piston rod as the shoulder 228a of the piston rod engages the top surface 229a of the seat closure section. The lifting gas from the tubing T then flows through the discharge passage or port 212a and the ports 205a into the annulus to lift the column of well fluids to the surface. When the pressure of the lifting gas in the tubing drops below the pressure of the charge of gas biasing the bellows 55a downwardly, the closure 249a is moved to its closed position in engagement with the seat 284a and the pressure differential, existing across the piston rod 225a, since the pressure in the annulus is of course lower at all times than the pressure within the tubing, causes the piston rod and the closure 216 to be moved upwardly since the pressure on the opposite sides of the piston 236a is now equalized.

Figure 15:
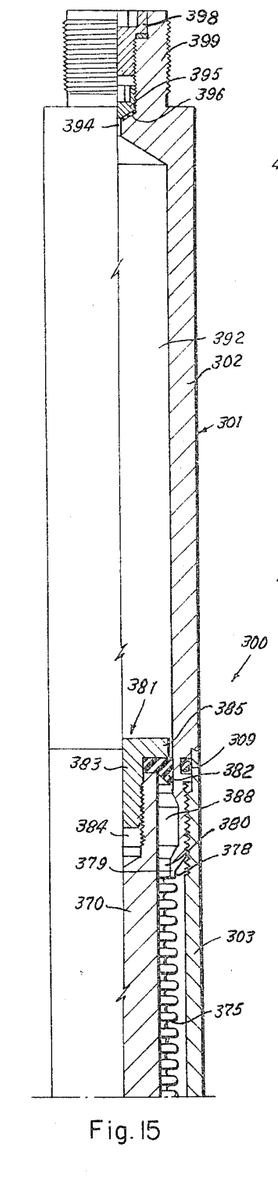
FIGURE 15 is a vertical partly sectional view of the upper portion of another modified form of the gas lift valve embodying the invention.
Figures 16, 17:
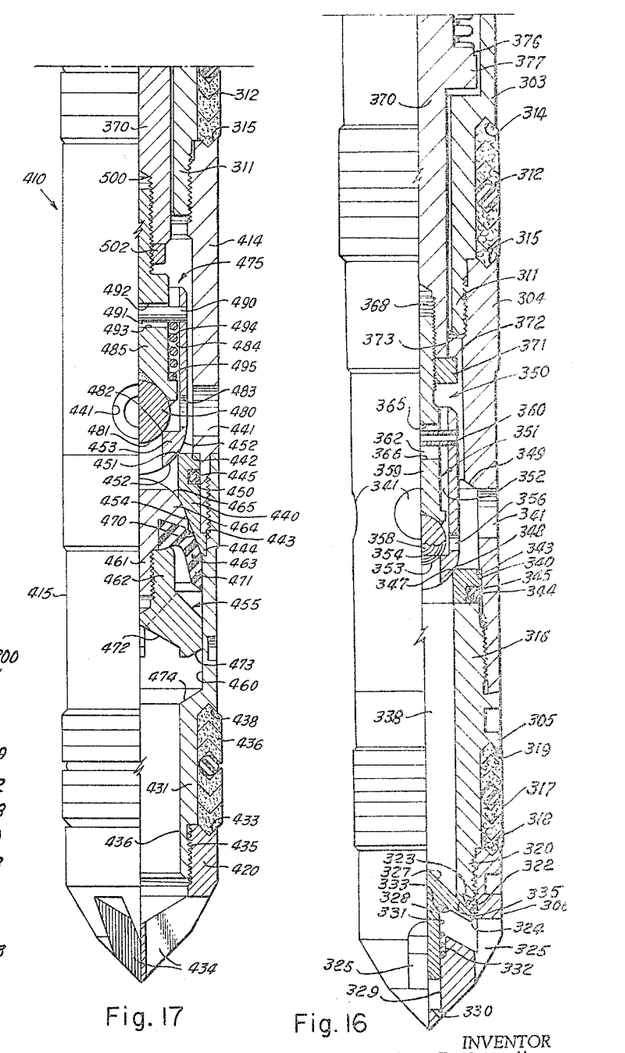

Referring now particularly to FIGURES 15 and 16 of the drawing, the gas lift valve 300, there illustrated, which is receivable in an offset pocket of a mandrel in the same manner as the valve 20b illustrated in FIGURES 3 and 4, includes a substantially tubular housing 301 having a top or charge chamber section 302, a bellows section 303 threaded on the lower reduced portion, an inlet port section 304, a seal section 305 and a bottom section 306. The top housing section has a reduced lower end portion 308 threaded in the upper end of the bellows housing section and is provided with an external annular recess which is disposed an O-ring 309 which seals between the top and bellows housing sections. The lower reduced end portion 311 of the bellows housing section is threaded into the upper end of the inlet port housing section 304. A seal assembly 312 is disposed about an intermediate portion of the bellows housing section. The seal assembly is held against upward movement on the bellows section by its engagement with the downwardly facing shoulder 314 of the bellows housing section and against downward movement by its engagement with the upwardly facing annular shoulder 315 of the inlet port housing section 304. The lower end portion of the inlet port housing section 304 is threaded on the upper reduced portion 316 of the seal housing section 305. A lower seal assembly 317 is disposed on the seal housing section, its downward movement being limited by the upwardly facing shoulder 318 of the bottom housing section and its upward movement being limited by its engagement with the annular downwardly facing shoulder 319 of the seal housing section. The bottom housing section is threaded on the reduced lower end portion 320 of the seal housing section.

An annular resilient seal 322 is disposed in an annular recess 323 of the seal housing section and is held against downward displacement by the upwardly facing shoulder of the internal annular flange 324 of the bottom housing section which is above the outlet ports 325 of the bottom housing section. The resilient seal is engageable by a check valve 327 whose stem 328 is slidable in a longitudinal bore 329 of the bottom housing section. The check valve is biased upwardly towards closed position and in sealing engagement with the resilient seal by a spring 331 whose lower end engages the upwardly facing internal annular shoulder 332 of the bottom housing section and whose upper end engages the downwardly facing annular stop surface 333 of the check valve. A vent 330 of the bottom section communicates the lower end of the bore 329 with the exterior of the housing. Upward movement of the check valve is limited by its engagement with the annular or bottom end shoulder 335 of the seal housing section. The check valve prevents flow of fluids from the exterior of the housing through the outlet ports 325 of the housing into the discharge port or passage 338 of the valve.

An annular seat ring 340 is disposed in the inlet port housing 304 below its inlet ports 341. Upward movement of the seat ring 340 is limited by the engagement of its top surface with the annular downwardly facing shoulder 343 of the inlet port housing section and its downward movement is limited by its engagement with the upper annular end shoulder 344 of the seal housing section. An O-ring or other suitable seal means 345 disposed in an annular external recess of the seat ring seals between the seat ring and the housing sections 304 and 305. The seat ring 340 provides an annular seat surface 347 which is engageable by the arcuate outer surface 348 of the seat section 349 of the closure member 350.

The bellows section 351 of the closure member extends downwardly into the longitudinal passage 352 of the tubular seat section and its arcuate lower end surface 353 is sealingly engageable with the internal upwardly facing annular seat 354 of the seat section to close the passage of the seat section below the lateral ports 356 thereof. The outer surface 353 is provided by a ball section 358 of the bellows section which is rigidly secured to the stem 359 of the bellows section in any suitable manner, as by welding.

A connector pin 360 rigidly secured to the bellows section extends transversely through the passage 352 and through a transverse longitudinally extending slot 362 of the stem 351.

The engagement of the connector pin 360 with the top and bottom shoulders 365 and 366, respectively, defining the upper and lower ends of the slot limits the longitudinal movement of the bellows section relative to the seat section.

The upper end portion of the stem of the bellows section of the closure member is threaded in a downwardly opening bore 368 of the bellows rod 370. A stop ring 371 threaded on the stem extends outwardly of the lower end of the bellows rod and its upper annular end surface 372 is engageable with the lower end bottom surface shoulder 373 of the bellows housing section to limit upward movement of the bellows rod in the housing. The tubular corrugated bellows 375 has a bottom annular end portion 376 which telescopes over the annular external flange 377 of the bellows rod and is secured thereto in seal tight relationship in any suitable manner, as by welding or soldering. The top annular end portion 378 of the bellows telescopes over the reduced lower end bottom portion 379 of the top housing section and is similarly secured thereto in seal tight relationship.

The lower end of the bellows is thus closed by the bellows rod while its upper end opens into a chamber 380 defined by the internal surface of the top housing section. The bellows rod and piston assembly 381 which includes an annular piston seal member and a retainer 383 threaded in the upwardly opening bore 384 of the upper end of the bellows rod. The inner portions of the seal member between the external flange 385 of the retainer and the upper end of the bellows rod.

The top housing section has an internal annular recess 388 which is disposed below the seal surface 390 of the top housing section sealingly engaged by the piston member seal 382 when the valve is in its operative condition.

The annular space between the bellows and the bellows rod and the chamber 380 which communicates with the upper end of the bellows are filled with an incompressible liquid. The charge chamber or space 392 above the piston assembly is filled with a charge of air or gas under pressure through an inlet port 394 of the top housing section which is closable by a suitable plug 395 which engages a gasket 396. A protective nut 398 is threaded in the upper enlarged portion of the inlet passage 394 to protect the plug 395. The upper end portion 399 of the top housing section is reduced and threaded whereby a suitable locking device, such as the locking device 102 illustrated in FIGURE 3, may be connected to the valve housing.

The space between the bellows and the bellows rod and the chamber 380 is filled with an incompressible liquid before the bellows housing section 303 is connected to the top housing section 302 after the bellows rod has been pulled to position the piston seal member 382 in alignment with the internal recess 388. The incompressible liquid is then introduced into the housing through the inlet port 394 and flows past the seal member into the chamber 380 below the seal ring 382 and into the bellows. The bellows is then allowed to contract as the bellows rod moves upwardly and the piston seal member moves out of alignment with the annular recess 388 and into sealing engagement with the seal surface 390. The housing bellows section 303 and lower portions of the housing 301 may then be connected to the top section. The charge chamber 392 is then filled with gas to a predetermined pressure and the inlet port 394 is then closed.

The valve is then in operative condition and may be lowered into an offset pocket 107 of a mandrel 104, FIGURE 3, in the same manner as the valve 20b and will operate in a similar manner. The bellows moves the bellows section of the closure member upwardly when the pressure of the lifting gas in the annulus of a well exceeds a predetermined value and the hydrostatic pressure of the colum of well liquids in the tubing attains a predetermined height. As the bellows section moves upwardly the seat surface 353 moves out of engagement with the seat surface 354 of the seat section and the pressure differential across the seat section is momentarily balanced. The pressure of the lifting gas exerted on the bellows is then effective to move the seat section upwardly to its open position to open the discharge passage or port 338 of the valve and permit flow of lifting gas therethrough, past the check valve which is now moved to its open position by the pressure differential thereacross, and through the outlet ports 325 of the housing into the tubing to lift the column of well liquids to the surface in the manner described heretofore in connection with the valve 20b. Upward movement of the bellows rod, and therefore of the piston assembly, is limited by the engagement of the stop ring 371 with the bottom shoulder 373 of the bellows housing section. The bellows is therefore now protected against excessive forces which may be exerted thereon by the lifting gas since the incompressible liquid in the bellows and the chamber is trapped and prevents any excessive deformation or crushing of the bellows.

It will be apparent that if desired a spring may be used instead of a charge of compressed gas to bias the closure member 350 toward closed position in the same manner as in the valve 20 illustrated in FIGURE 1. In this case, the top housing section 305 would have the form of the top housing section 33 of the valve 20 and would be provided with an adjusting nut by means of which the force exerted by such spring on the piston means 381 could be adjusted.

Referring now to the modification of the valve of the invention shown in FIGURE 17, the lower portion of a gas lift valve 410 similar to the lower portion of the gas lift valve of FIGURE 16, includes an inlet port section 414, a check valve and seal section 415, and a bottom section 420. The lower reduced end portion 311 of the bellows housing section 303 is threaded into the upper end of the inlet port housing section 414. A seal assembly 312 is disposed about the reduced lower end portion of the bellows housing section and confined thereon by the upper end of the inlet port section 414. The upper end of the sealing section is prevented from upward movement by engagement with a shoulder similar to the shoulder 314 on the bellows housing section 311 of FIGURE 16.

The lower end of the inlet port housing section 414 is threaded into the upper end of the seal and check valve housing section 415, and a lower seal assembly 430 is disposed about the lower reduced end portion 431 of said seal and check valve housing section and is confined thereon between the shoulder 432 and an upwardly facing shoulder 433 on the upper end of the bottom housing section 420, which is threaded onto a further reduced lower portion 435 of the seal and check valve housing section 415. A plurality of outlet ports 434 are formed through the lower end of the bottom housing section 420 to permit fluid communication between the lower bore 436 of the lower end of the seal and check valve housing section with the exterior of the lower end of the bottom housing section 420.

An annular seat ring 440 is disposed in the inlet port housing section 415 below a plurality of lateral inlet ports 441 formed therein. Upward movement of the seat ring is limited by the engagement of its upper surface with an internal annular downwardly facing shoulder 442 in the bore of the inlet port housing section and by engagement of an upwardly facing external annular shoulder 443 on the seat ring with the lower end of the inlet port housing section. The seat ring is held against downward movement by the engagement of the lower end of the seat ring with an upwardly facing internal annular shoulder 444 formed within the upper portion 460 of the bore of the check valve and seal housing section 415. An O-ring 445, or other suitable seal means, is disposed in an annular external recess 450 in the seat ring to seal between the seat ring and the housing section. The seat ring provides an upwardly and inwardly facing annular seat surface 451 which is engageable by the arcuate lower outer surface 452 of a tubular valve member 453. The seat ring also provides a downwardly and inwardly facing annular arcuate seat surface 454 which is of substantial width and is engageable by the upper end of a check valve 455 which is slidable longitudinally within the upper bore 460 of the check valve and seal housing section.

A check valve 455 includes a central body 461, a lower spider 462, and an annular resilient inverted cup seal member 463. The central body of the check valve has its reduced lower end portion threaded into the upper end of the spider and is provided on its upper end with a dome or head section 464, the outer portion 465 of which is engageable with the seat surface 454 of the seat ring 440. The inner flange portion of the seal member 463 is confined between a downwardly facing shoulder 470 provided below the dome section of the body member 461 and the upper end of the spider 462 of the check valve assembly, whereby the seal member is secured on the body member. The outer surface of the lip 471 of the seal member below and outwardly of the surface 464 of the dome section is engageable with the bore 460 of the seal and check valve housing section and with the seat surface 454 of the seat ring 440 to seal therewith to prevent upward flow through said seat ring. The lip 471 of the seal member is deformable inwardly out of sealing position by downward fluid flow through the bore of the check valve and seal section 415 of the housing. A plurality of radially spaced leg members 472 extend downwardly and outwardly from the body of the spider 462 and at their outer ends slidably engage the bore wall 460 of the check valve and seal section to guide the valve assembly in its slidable longitudinal movement therein, fluid flow being permitted between the leg members through the bore of said check valve and seal section of the housing.

The lower shoulders 473 of the leg members are engageable with an upwardly and inwardly facing annular shoulder 474 formed within the seal and check valve housing section 415 at the juncture of the upper bore 460 and the lower bore 436 thereof. The check valve assembly is thus slidable longitudinally within the housing section 415, its upward movement being limited by the engagement of the dome surface 465 with the seat surface 454 of the seat ring 440 and its downward movement being limited by the engagement of the shoulders 473 of the spider with the annular shoulder 474 within the bore of the housing section. The check valve prevents flow of fluid through the bore of the housing from the exterior of the housing upwardly through the ports 434 to the inlet ports 441 of the housing, but permits downward flow of fluids through the bore past the seal member 463.

The passage through the seat 451 at the upper end of the seat ring 440 below the lateral ports 441 is closable by a valve closure member 475. The stem or bellows connector section 485 of the closure member extends downwardly into the longitudinal passage 481 of the tubular valve member 453 which form as a part of the closure member. A ball 480 is welded or otherwise secured to the lower end of the bellows connector section 485 and the lower arcuate end surface 481 of the ball sealingly engages an internal upwardly facing annular seat 482 in the bore of the tubular valve member 453 to close the lower reduced portion of the bore 484 of the valve member to close off flow through the seat 451 of the seat ring.

Lateral ports 483 formed in the side wall of the tubular valve member 453 provide communication between the exterior of the valve member and the bore 484 thereof above the seat 482 therein, whereby fluid may flow inwardly through the lateral inlet ports 441 into the housing 414 and through the lateral ports 483 into the bore of the tubular valve member and, when the ball 480 is lifted off the seat 482, may flow downwardly through the reduced lower portion of the bore 484 of the tubular valve member below the seat 482. When, however, the ball 480 is in engagement with the seat 482, downward fluid flow from the lateral inlet ports 441 through the seat 451 of the seat ring 440 is prevented.

A connector pin 490 rigidly secured to the tubular valve member extends transversely across the bore 484 thereof and through a transversely extending slot 491 of the stem or bellows connector section 485. The transverse slot is longitudinally elongated and has an upper shoulder 492 and a lower shoulder 493 defining its upper and lower limits, which shoulders engage the pin 490 to limit longitudinal movement of the stem or bellows section 485 relative to the tubular valve member 453. A spring 494 is disposed around about the stem or bellows connector section 485 and is confined thereon between the connector pin 490 and an upwardly facing external annular shoulder 495 on the lower portion of the stem or bellows connector section. The spring 494 biases the tubular valve member 453 upwardly relative to the stem or bellows connector member to engage the seat 482 in the valve member with the arcuate lower surface 481 of the ball 480. The spring 494 functions in the opening of the closure member 475 to raise the tubular member immediately after disengagement of the ball 480 from the seat 482, and also serves to hold the tubular valve member in contact with the ball 480 after the seat 451 has been opened. The closure member is thus similar in operation in this respect to the valve structure shown in FIGURE 8 hereof.

The upper end portion of the stem or bellows connector member 485 is threaded into a downwardly opening bore 500 in a bellows rod 370 connected with a bellows similar to the bellows 375 of FIGURE 15, and the stem is locked against longitudinal movement with respect to the bellows rod by a lock nut 502 threaded on the stem and engaging the lower end of the bellows rod. This lock nut also provides means for adjusting the length or position of the bellows connector with respect to the bellows rod, whereby the position of the ball valve 480 and the tubular valve member 453 may be controlled to assure the same seating on the seat 451 to close the bore of the seat ring 440 and to establish a proper relationship between the bellows and the ball and seat.

Actuation of the tubular valve member and the bellows connector member or stem is effected by means of a bellows structure similar to the structures shown in FIGURES 1 and 15.

When the gas lift valve is in operating position in a seating nipple connected in a well flow tubing or conductor, such as that shown in FIGURE 3, the pressure of the lifting gas present in the seating nipple and on the exterior of the inlet port section 414 and check valve housing 415 enters the lateral ports 441 and is communicated around the tubular valve member 453 above the seat 451, and also acts on the surfaces of the bellows connector member and the bellows connected therewith. The pressure charge within the bellows acts on the bellows connector or stem and maintains the ball valve 480 in seating engagement with the seat 482 in the tubular valve member 453, and thus prevents lifting gas from passing downwardly through the seat ring 440 and the bore 436 of the check valve housing and outwardly through the ports 434 to lift fluid in the well. However, when the pressure of the lifting gas exceeds a predetermined value determined by the pressure charge within the bellows chamber connected with the bellows stem 485, the bellows is contracted and the bellows stem is lifted upwardly to lift the ball valve 480 off the seat 482. Immediately after the ball has been lifted from the seat, pressure communicated through the lateral ports 441 passes through the lateral ports 483 of the tubular valve member and through the seat 482 to the bore of the seat ring 440 below the lower surface 452 at the lower end of the tubular valve member and equalizes pressures across the tubular valve member, whereby the force of the spring 494 acting against the pin 490 lifts the tubular valve member from the seat 451 to effect full opening of the valve seat ring 440. The spring 494 causes the tubular valve section 453 to move out of engagement with the seat 451 as quickly as possible after the bellows connector member 485 has lifted the ball 480 out of engagement with the seat 482, and thus the spring biases the tubular valve member upwardly and facilitates opening of the seat 451. If, for any reason, the tubular valve member 453 is not lifted by the spring 494; as for example, if the tubular member sticks for any reason, the upwardly facing shoulder or surface 493 at the lower end of the transverse slot 491 in the bellows stem will engage the pin 490 to lift the tubular member from the seated position.

As the lifting gas introduced into the well tubing lifts the well fluids upwardly therein, the pressure of the column in the tubing is reduced or decreases, so that the pressure of the charge in the bellows acting through the stem or bellows connector member 485 and the ball 480 at the lower end thereof again moves the tubular valve member 453 downwardly into engagement with the seat 451 in the seat ring 440. The ball 480, being in engagement with the seat 482 in the bore of the tubular valve member forces the tubular valve member downwardly with the bellows connector member, and upon engagement of the lower arcuate surface 453 of the tubular valve member with the seat 451 the passage through the seat ring 440 is closed off.

The charge within the bellows acting through the bellows connector member maintains the tubular valve member and the ball in position closing the passage through the seat 451 of the seat member until the pressure of the lifting gas acting on the bellows is sufficient to again lift the bellows connector member and the ball at the lower end thereof upwardly off the seat 482 to initially open the passage through the tubular valve member and permit the spring 494 to lift the valve member upwardly off the seat 451 to fully open the passage through the seat ring.

It will thus be seen that this form of the valve member functions in substantially the same manner as the forms previously described to provide for a lower initial pressure operation opening the passage through the seat 482 in the tubular valve member and subsequently providing a larger opening through the seat 451 in the seat ring.

The check valve assembly 455 prevents back flow of pressure through the valve to the lateral inlet ports 441.

It will now be seen that any of the illustrated and described valves embodying the invention may be provided with the new and improved means for limiting contracting movement of the bellows and for preventing damage to the bellows by pressure forces to which the bellows are exposed and that such means includes a piston means for closing a chamber whose volume increases as the bellows contracts to receive the compressible liquid from the bellows, the increase in the volume of the chamber being arrested when the movement of the piston means is stopped after the closure member operated by the bellows has been moved thereby to its open position.

It will further be seen that the biasing force tending to move the closure member to its closed position may be exerted either by a charge of gas, a spring, or both, such biasing force being exerted on the bellows connected to the closure member through a piston means and an incompressible liquid.

It will further be seen that each of the several described and illustrated forms of the gas lift valve embodying the invention includes a two section closure or closure member for closing a discharge port or passage of the housing of the valve through which lifting gas is injectible from a gas lift passage of a well into its well fluid passage, one of the closure sections being annular in form and engageable with a seat of the housing about the discharge passage and an inner section engageable with the annular closure section for closing the passage thereof whereby the surface of the second section which is exposed to the pressure of the well fluids in the well fluid passage is relatively small when the closure is in its closed position so that the second closure section is movable to its open position by a relatively small force exerted thereon by the pressure from the lifting gas passage of the well to open the relatively small passage of the annular closure section and permit equalization of the pressure across the annular closure section which is then easily movable to its open position to open the full orifice of such discharge passage or port of the housing of the valve.

It will further be seen that the two section closure members are especially suitable for use in gas lift valves of the bellows type in order that the spread between the opening and closing pressures of the lifting gas be small while at the same time providing a discharge port or passage of large effective orifice for the passage of lifting gas.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A gas lift valve for use in a well having a flow conductor extending therethrough and providing a first passage to the surface of the well, the well having an annular passage about said flow conductor, one of the passages constituting a lifting gas passage through which fluid under pressure is introducible into the well and the other passage constituting a well fluid passage through which well fluids produced by the well are movable to the surface, the flow conductor having a lateral port, said gas lift valve including: a housing connectible to said flow conductor, said housing having a passage one end of which communicates with said lifting gas passage and the other end of which communicates with said well fluid passage through the lateral port of the well flow conductor when said housing is connected to said flow conductor, said housing having a seat about said passage; a closure movably mounted in said housing, said closure comprising a first annular seat section engageable with said housing seat and having a passage therethrough and a second section, said first section having a seat about its passage, said second section being engageable with said seat of said first section for closing said passage of said first section; and operator means responsive to the pressures within the well fluid passage and the lifting gas passage for moving said second section relative to said first section to open said passage of said first section and then moving said first section out of engagement with said housing seat to open said passage of said housing to flow of lifting gas from said gas lift passage to said well fluid passage when pressures in the well fluid and lifting gas passages attain predetermined values and for subsequently closing said housing passage when the pressure in said lifting gas passage decreases to a predetermined value.

2. A gas lift valve for use in a well having a flow conductor extending therethrough and providing a first passage to the surface of the well, the well having an annular passage about said flow conductor, one of the passages constituting a lifting gas passage through which fluid under pressure is introducible into the well and the other passage constituting a well fluid passage through which well fluids produced by the well are movable to the surface, the flow conductor having a lateral port, said gas lift valve including: a housing connectible to said flow conductor, said housing having a passage one end of which communicates with said lifting gas passage and the other end of which communicates with said well fluid passage through the lateral port of the well flow conductor when said housing is connected to said flow conductor, said housing having a seat about said passage; a closure movably mounted in said housing, said closure comprising a first annular seat section engageable with said housing seat and having a passage therethrough and a second section, said first section having a seat about its passage, said second section being engageable with said seat of said first section for closing said passage of said first section; and operator means responsive to the pressures within the well fluid passage and the lifting gas passage for moving said second section relative to said first section to open said passage of said first section and then moving said first section out of engagement with said housing seat to open said passage of said housing to flow of lifting gas from said gas lift passage to said well fluid passage when pressure in the well fluid and lifting gas passages attain predetermined values and for subsequently closing said housing passage when the pressure in said lifting gas passage decreases to a predetermined value; said operator means comprising means exposible to the pressure from the lifting gas passage for moving said second section out of engagement with said seat of said first section and permitting subsequent movement of said first section out of engagement with said seat of said housing.

3. A gas lift valve for use in a well having a flow conductor extending therethrough and providing a first passage to the surface of the well, the well having an annular passage about said flow conductor, one of the passages constituting a lifting gas passage through which fluid under pressure is introducible into the well and the other passage constituting a well fluid passage through which well fluids produced by the well are movable to the surface, the flow conductor having a lateral port, said gas lift valve including: a housing connectible to said flow conductor, said housing having a passage one end of which communicates with said lifting gas passage and the other end of which communicates with said well fluid passage through the lateral port of the well flow conductor when said housing is connected to said flow conductor, said housing having a seat about said passage; a closure movably mounted in said housing, said closure comprising a first annular seat section engageable with said housing seat and having a passage therethrough and a second section, said first section having a seat about its passage, said second section being engageable with said seat of said first section for closing said passage of said first section; and operator means responsive to the pressure within the well fluid passage and the lifting gas passage for moving said second section relative to said first section to open said passage of said first section and then moving said first section out of engagement with said housing seat to open said passage of said housing to flow of lifting gas from said gas lift passage to said well fluid passage when pressure in the well fluid and lifting gas passages attain predetermined values and for subsequently closing said housing passage when the pressure in said lifting gas passage decreases to a predetermined value, said operator means including a bellows connected to said second section and exposed to the pressure from said lifting gas passage whereby the pressure from the lifting gas passage tends to cause said bellows to contract, and means biasing said bellows toward expanded position wherein said bellows holds said second section in engagement with said seat of said first section and said first section in engagement with said seat of said housing.

4. A gas lift valve for use in a well having a flow conductor extending therethrough and providing a first passage to the surface of the well, the well having an annular passage about said flow conductor, one of the passages constituting a lifting gas passage through which fluid under pressure is introducible into the well and the other passage constituting a well fluid passage through which well fluids produced by the well are movable to the surface, the flow conductor having a lateral port, said gas lift valve including: a housing connectible to said flow conductor, said housing having a passage one end of which communicates with said lifting gas passage and the other end of which communicates with said well fluid passage through the lateral port of the well flow conductor when said housing is connected to said flow conductor, said housing having a seat about said passage; a closure movably mounted in said housing, said closure comprising a first annular seat section engageable with said housing seat and having a passage therethrough and a second section, said first section having a seat about its passage, said second section being engageable with said seat of said first section for closing said passage of said first section; and operator means responsive to the pressure within the well fluid passage and the lifting gas passage for moving said second section relative to said first section to open said passage of said first section and then moving said first section out of engagement with said housing seat to open said passage of said housing to flow of lifting gas from said gas lift passage to said well fluid passage when pressure in the well fluid and lifting gas passages attain predetermined values and for subsequently closing said housing passage when the pressure in said lifting gas passage decreases to a predetermined value, said operator means including a bellows connected to said second section and exposed to the pressure from the lifting gas passage whereby the pressure from the lifting gas passage tends to bias said bellows toward contraction, said bellows being connected at one end to said second section, said housing having a chamber opening to said bellows at the other end of said bellows, piston means inside the housing mounted for limited longitudinal movement in said housing and closing one end of said chamber, and an incompressible liquid filling said chamber and said bellows, movement of said bellows toward contracted position moving said closure to its open position causing said piston means to move to expand the volume of said chamber as said bellows contracts, contraction of said bellows being arrested when movement of said piston means is arrested.

5. A gas lift valve for use in a well having a flow conductor extending therethrough and providing a first passage to the surface of the well, the well having an annular passage about said flow conductor, one of the passages constituting a lifting gas passage through which fluid under pressure in introducible into the well and the other passage constituting a well fluid passage through which well fluids produced by the well are movable to the surface, the flow conductor having a lateral port, said gas lift valve including: a housing connectible to said flow conductor, said housing having a passage one end of which communicates with said lifting gas passage and the other end of which communicates with said well fluid passage through the lateral port of the well flow conductor when said housing is connected to said flow conductor, said housing having a seat about said passage; a closure movably mounted in said housing, said closure comprising a first annular seat section engageable with said housing seat and having a passage therethrough and a second section, said first section having a seat about its passage, said second section being engageable with said seat of said first section for closing said passage of said first section; and operator means responsive to the pressure within the well fluid passage and the lifting gas passage for moving said second section relative to said first section to open said passage of said first section and then moving said first section out of engagement with said housing seat to open said passage of said housing to flow of lifting gas from said gas lift passage to said well fluid passage when pressure in the well fluid and lifting gas passages attain predetermined values and for subsequently closing said housing passage when the pressure in said lifting gas passage decreases to a predetermined value, said operator means including a bellows connected to said second section and exposed to the pressure from the lifting gas passage whereby the pressure from the lifting gas passage tends to bias said bellows toward contraction, said bellows being connected at one end to said second section, said housing having a chamber opening to said bellows at the other end of said bellows, piston means inside the housing mounted for limited longitudinal movement in said housing and closing one end of said chamber, and an incompressible liquid filling said chamber and said bellows, movement of said bellows toward contracted position moving said closure to its open position causing said piston means to move to expand the volume of said chamber as said bellows contracts, contraction of said bellows being arrested when movement of said piston means is arrested; and biasing means biasing said piston means toward said bellows to hold said incompressible liquid under a predetermined pressure.

6. A gas lift valve for use in a well having a flow conductor extending therethrough and providing a first passage to the surface of the well, the well having an annular passage about said flow conductor, one of said passages constituting a lifting gas passage through which fluid under pressure is introducible into the well and the other passage constituting a well fluid flow passage through which fluids produced by the well are movable to the surface, the flow conductor having a lateral port providing communication between said passages, said gas lift valve including: a housing connectable to said flow conductor adjacent said lateral port, said housing having a passage one end of which communicates with said lifting gas passage and the other end of which communicates with said well fluid passage when said housing is connected to said flow conductor; said housing having a seat about said passage; closure means for closing said passage, said closure means comprising a first annular seat section engageable with said housing seat and having a passage therethrough, and a second section; said first section having a seat about its passage, said second section being engageable with said seat of said first section for closing said passage of said first section; and operator means responsive to the pressures within the well fluid passage and the lifting gas passage for moving said closure means relative to the seat in the housing passage to control flow therethrough, said operator means moving said second section relative to said first section to open said passage of said first section and then moving said first section out of engagement with said housing seat to open said passage of said housing to flow of fluids through the passage of the housing to permit lifting gas from said gas lift passage to flow to said well fluid passage when pressures in said well fluid and lifting gas passages attain first predetermined values, said operator means subsequently moving said closure to position closing said housing passage when the pressure in said lifting gas passage and said well fluid passage attain second predetermined values.

7. A gas lift valve of the character set forth in claim 6 wherein said first section is biased toward said second section of said closure means.

8. A gas lift valve of the character set forth in claim 6 wherein means is provided in said closure means acting on said first section biasing said first section toward engagement with said second section.

9. A gas lift valve with the character set forth in claim 6 wherein means is provided in said closure biasing said first section toward disengagement with said seat of said housing and toward engagement with said second section.

10. A gas lift valve of the character set forth in claim 7 wherein said first section is biased by gravity toward engagement with said second section.

11. A gas lift valve of the character set forth in claim 7 wherein said biasing means comprises resilient means in said first section and engageable with said second section for biasing said first section for movement with respect to said second section toward engagement of said seat in said passage of said first section with said second section to close said passage.

12. A gas lift valve for use in a well having a flow conductor extending therethrough and providing a first passage to the surface of the well, the well having an annular passage about said flow conductor, one of said passages constituting a lifting gas passage through which fluid under pressure is introducible into the well and the other passage constituting a well fluid flow passage through which fluids produced by the well are movable to the surface, the flow conductor having a lateral port providing communication between said passages, said gas lift valve including: a housing connectible to said flow conductor adjacent said lateral port, said housing having a passage therein one end of which communicates with said lifting gas passage and the other end of which communicates with said well fluid passage when said housing is connected with said flow conductor, said housing having a seat about said passage; closure means for closing said passage, said closure means comprising a first annular seat section engageable with said housing seat and having a flow passage therethrough, and a second section; said first section having a seat about its passage, said second section being engageable with said seat of said first section for closing said passage of said first section; operator means for moving said closure means between a closed position wherein said closure means closes said passage of said housing and an open position wherein said passage is open to fluid flow therethrough, said operator means being connected to said second section of said closure means for moving said second section out of engagement with said seat of said first section to permit subsequent movement of said first section out of engagement with said seat of said housing to open fully said housing passage, said housing passage having a greater orifice than said passage of said first section, said closure sections being movable a limited distance with respect to each other and having coengageable means limiting such movement of said sections whereby said second section is moved by said operator means out of engagement with said seat of said first section and first section is then movable out of engagement with said seat of said housing; said coengageable means comprising recess means in one of said first and second sections and shoulder means on the other of said first and second section and engageable with said one of said sections for limiting movement of said sections relative to each other.

13. A device of the character set forth in claim 12 wherein said recess means comprises a slot in one of said first and second sections and said shoulder means comprises a pin connected to the other of said first and second sections and engageable with said one of said sections for limiting movement of said sections relative to each other.

14. A device of the character set forth in claim 12 wherein means is provided in said closure means acting on said first section biasing said first section toward engagement with said second section.

15. A device of the character set forth in claim 14 wherein said biasing means comprises a resilient member within said first section and engageable with said second section and with said pin for moving said first section relative to said second section.

16. A gas lift valve of the character set forth in claim 1 wherein said first and second sections have coengageable means limiting movement of said sections relative to one another said second section being operably connected to said operator means whereby said second section is moved by said operator means out of engagement with said seat in said first section and said coengageable means then is engaged to move said first section out of engagement with said seat of said housing.

17. A gas lift valve of the character set forth in claim 1 wherein said housing passage has a greater orifice through the seat therein than the orifice through the seat of said first section; and said closure includes means providing limited longitudinal relative movement of said second section with respect to said first section, and means biasing said sections toward positions wherein said second section engages said first section and said first section engages said seat of said housing.

18. A gas lift valve of the character set forth in claim 1 wherein said second sectiton of said closure is operatively connected with said operator means to be moved longitudinally thereby, whereby said second section is moved by said operator means out of engagement with said seat in said first section to open the passage through said first section and said first section is subsequently moved out of engagement with said seat in said housing to open the passage through the seat in the housing.

19. A gas lift valve of the character described in claim 1 having means for connecting said operator means to said second section for moving said second section out of engagement with said seat of said first section, and means connecting said second section with said first section to permit subsequent movement of said first section out of engagement with said seat of said housing to open fully said passage through said seat of said housing.

20. A gas lift valve of the character set forth in claim 1 wherein magnet biasing means is provided on said first and second sections of said closure means biasing said first section toward engagement with said second section.

21. A gas lift valve of the character set forth in claim 12 wherein magnet biasing means is provided on said first and second sections of said closure means biasing said first section toward engagement with said second section.

References Cited by the Examiner
UNITED STATES PATENTS

| | | | |
|---|---|---|---|
| 2,642,812 | 6/1953 | Robinson | 137—155 X |
| 2,685,892 | 8/1954 | Edwards | 137—630.14 |
| 2,718,898 | 9/1955 | Cotton | 137—630.14 X |
| 2,761,465 | 9/1956 | Garrett | 137—155 |
| 2,869,584 | 1/1959 | Gordon | 137—630 |
| 3,014,500 | 12/1961 | McGowen | 137—155 X |

WILLIAM F. O'DEA, *Primary Examiner.*

A. COHAN, *Assistant Examiner.*